(12) United States Patent
Cha et al.

(10) Patent No.: US 12,145,658 B2
(45) Date of Patent: Nov. 19, 2024

(54) SPACE UTILIZATION APPARATUS FOR MOBILITY

(71) Applicants: Hyundai Motor Company, Seoul (KR); Kia Corporation, Seoul (KR)

(72) Inventors: Dong Eun Cha, Gyeonggi-Do (KR); Sang Heon Lee, Seoul (KR); Jin Ho Hwang, Chungcheongnam-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 324 days.

(21) Appl. No.: 17/696,597

(22) Filed: Mar. 16, 2022

(65) Prior Publication Data

US 2023/0044597 A1 Feb. 9, 2023

(30) Foreign Application Priority Data

Aug. 9, 2021 (KR) .................. 10-2021-0104838

(51) Int. Cl.
| | |
|---|---|
| *B62D 33/04* | (2006.01) |
| *B60N 2/02* | (2006.01) |
| *B60N 2/30* | (2006.01) |
| *B60N 2/32* | (2006.01) |

(52) U.S. Cl.
CPC .............. *B62D 33/04* (2013.01); *B60N 2/02* (2013.01); *B60N 2/3031* (2013.01); *B60N 2/32* (2013.01)

(58) Field of Classification Search
CPC .......... B60N 2/02; B60N 2/242; B60N 2/304; B60N 2/3027; B60N 2/3047; B60N 2/3097; B60N 2/3088; B60N 2/309; B60N 2/3093; A47C 9/06; B60P 3/07; B60P 3/077; B62D 33/04
See application file for complete search history.

(56) References Cited

U.S. PATENT DOCUMENTS

| | | | |
|---|---|---|---|
| 10,470,578 B2 | 11/2019 | Ehlinger | |
| 10,920,418 B2 | 2/2021 | Gosling et al. | |
| 2018/0055231 A1* | 3/2018 | Hamid | ...... A47C 4/04 |
| 2020/0139860 A1* | 5/2020 | Sakurai | ........ B60N 2/242 |

FOREIGN PATENT DOCUMENTS

| | | | | |
|---|---|---|---|---|
| JP | 2003310386 A | * | 11/2003 | ........ A47C 9/06 |
| JP | 3106501 U | * | 1/2005 | ........ A47C 9/06 |
| KR | 10-2020-0127835 | | 11/2020 | |
| KR | 10-2216392 | | 2/2021 | |

* cited by examiner

*Primary Examiner* — Daniel J Colilla
(74) *Attorney, Agent, or Firm* — Morgan, Lewis & Bockius LLP

(57) ABSTRACT

Each panel forming a variable mechanism is maintained in a state accommodated on an internal wall surface to secure a cabin space of a mobility, and according to the need of a passenger, the rotational position of each panel is changed so that a shape of the variable mechanism is transformed, providing a convenient function. Accordingly, a space utilization apparatus of mobility that can secure a cabin space by removing an unused space of the cabin space when the convenience function is not used in the cabin space of the mobility, and can improve the space utilization by selectively providing the convenience function.

17 Claims, 11 Drawing Sheets

SPACE UTILIZATION APPARATUS FOR MOBILITY

CROSS REFERENCE TO RELATED APPLICATION

The present application claims priority to Korean Patent Application No. 10-2021-0104838, filed Aug. 9, 2021, the entire contents of which is incorporated herein for all purposes by this reference.

BACKGROUND OF THE PRESENT DISCLOSURE

Field of the Present Disclosure

The present disclosure relates to a space utilization apparatus of mobility in which a cabin space of mobility is secured and a convenience function is selectively provided in accordance with a passenger's need, so that the space utilization is improved.

Description of Related Art

With the recent development of technology, various mobility is being developed to transfer passengers to a destination more conveniently and rapidly.

That is, conventionally, passengers who want to move have moved to a desired place by use of a private vehicle or public transportation, but the technology for providing a mobile service to passengers through autonomous driving mobility is being developed.

For such mobility, a space must be secured for the convenience of passengers, and a seating space or a loading space for goods including a small mobility must be provided according to the passenger's request.

To provide various functions to passengers in a limited space inside mobility, apparatuses for implementing specific functions must be installed in the internal space, but there is a problem in that the space inside the mobility is reduced as the installation location of each apparatus is fixed.

Furthermore, even if the apparatuses with specific functions are not used in the mobility, when each apparatus is present, it is difficult to secure a cabin space due to an unused space.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a space utilization apparatus of mobility in which space utilization is improved by securing the cabin space of mobility and selectively providing convenience function according to the need of a passenger, and the cabin space is secured by being stored and removing unused space of the cabin space when the convenience function is not used.

In various aspects of the present disclosure, the space utilization apparatus of mobility according to an exemplary embodiment of the present disclosure includes a mobility including an internal wall surface and a cabin space formed inside the internal wall surface; and a variable mechanism provided along the internal wall surface, and including a plurality of panels, wherein among the plurality of panels, a panel is slidably or rotatably connected to the internal wall surface, and remaining panels are rotatably connected to the panel so that a shape of the variable mechanism is transformed according to a rotational position of each panel to implement a plurality of functions.

A plurality of variable mechanism is arranged separately for each function on the internal wall surface of the mobility, and when the function is not implemented, each panel is maintained in an erected state, and when the function is implemented, each panel is configured to rotate toward the cabin space and the shape is transformed.

The panel of the variable mechanism includes an upper panel including a first end portion slidably provided on the internal wall surface, and the remaining panels of the variable mechanism include a middle panel including a first end portion rotatably connected to a second end portion of the upper panel; and a lower panel including a first end portion rotatably connected to a second end portion of the middle panel and a second end portion rotatably provided on the internal wall surface or a bottom surface of the mobility.

The variable mechanism is transformed into a shape for implementing a seat as the upper panel slides downward, and the middle panel and the lower panel rotate from the upper panel toward the cabin space.

The variable mechanism has a longer length in an order of the middle panel, the upper panel, and the lower panel.

A sliding groove extending in a predetermined direction is formed on the internal wall surface, and one end portion of the upper panel is provided with a slider which is inserted into the sliding groove and is configured to move along the sliding groove.

The slider is provided with a stopper that extends downward from the slider and is spaced from the bottom surface of the mobility with a predetermined distance in an initial state in which the upper panel, the middle panel, and the lower panel are unrotated, and when a specific function is implemented, as each panel rotates, the stopper is supported on the bottom surface to fix a rotational position of each panel.

The variable mechanism further includes a lifting mechanism including a first end portion connected to the stopper or the internal wall surface and a second end portion connected to the lower panel to adjust a rotation speed of the lower panel when the lower panel rotates.

An elastic mechanism which is elastically drawn in or drawn out is provided at first and second end portions of the slider, and the sliding groove is provided with a plurality of protrusions that comes into contact with the elastic mechanism when the slider moves in the predetermined direction.

A rotation shaft of the upper panel and the middle panel is provided at an end portion in a direction away from the internal wall surface at a connection portion of the second end portion of the upper panel and the first end portion of the middle panel.

A rotation shaft of the middle panel and the lower panel is provided at an end portion of the internal wall surface at a connection portion of the second end portion of the middle panel and the first end portion of the lower panel.

A flexible cover which is provided to be drawable in or out at the second end portion of the middle panel is connected to the first end portion of the lower panel, so that when the lower panel rotates in the middle panel, the flexible cover is disposed in a separation space between the middle panel and the lower panel.

The middle panel is disposed to be inclined at an oblique line and the lower panel is spaced from the internal wall surface rather than the upper panel.

The variable mechanism is transformed into a shape for implementing a storage as the upper panel slides downward and rotates toward the cabin space, the lower panel rotates toward the cabin space, the middle panel moves toward the cabin space to form a storage space thereinside.

The variable mechanism is configured so that the middle panel is longest, and lengths of the upper and lower panels are shorter than length of the middle panel.

A sliding groove extending in a predetermined direction is formed on the internal wall surface, and a slider which is inserted into the sliding groove and moves along the sliding groove is rotatably connected at one end portion of the upper panel.

A clamping mechanism for fixing an additional mobility is provided inside the middle panel.

A chamfer is formed in a portion where the second end portion of the upper panel and the first end portion of the middle panel match each other and at a portion where the second end portion of the middle panel and the first end portion of the lower panel match each other, respectively.

In the space utilization apparatus of mobility having the structure as described above, each panel forming the variable mechanism is maintained in a state accommodated on the internal wall surface to secure a cabin space for mobility, and the rotational position of each panel is changed according to the needs of passengers, so that the shape is transformed to provide convenience functions.

Accordingly, when the convenience function is not used in the cabin space of mobility, the unused space of the cabin space is removed to secure the cabin space, and the space utilization is improved as the convenient function is selectively provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
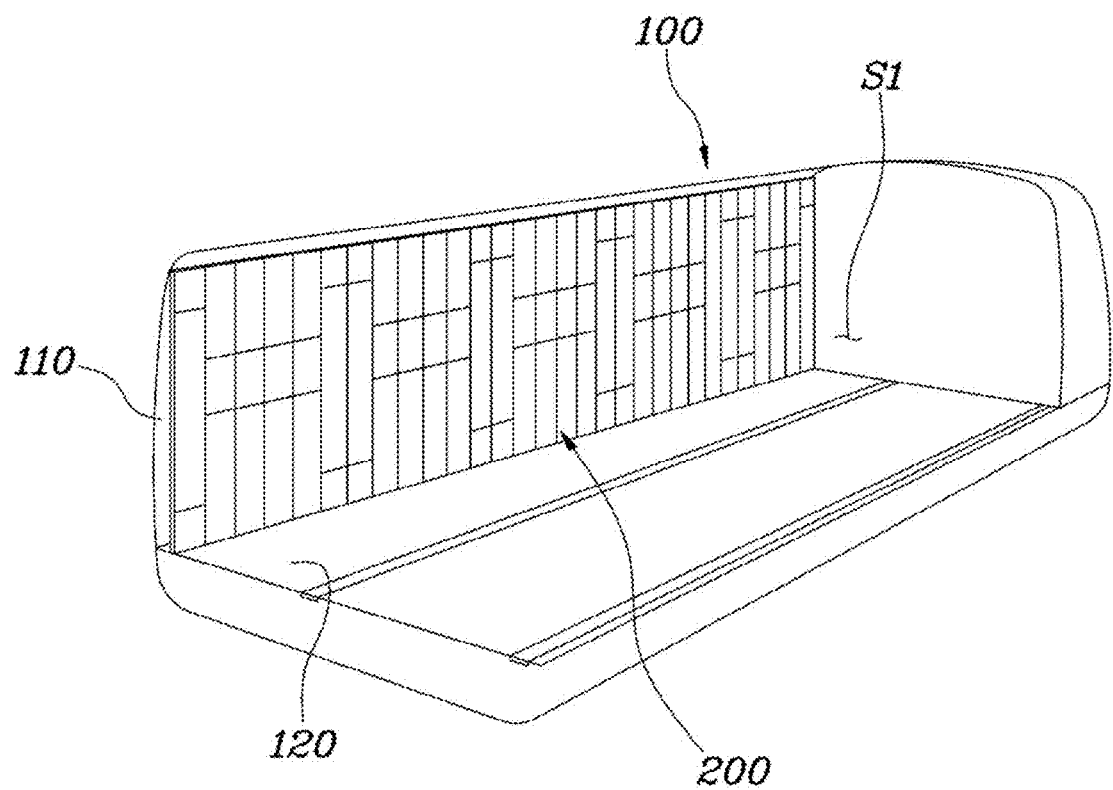
FIG. 1 is a view showing a space utilization apparatus of mobility according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a space utilization apparatus of mobility according to various exemplary embodiments of the present disclosure will be described with reference to the accompanying drawings.

Figure 2:
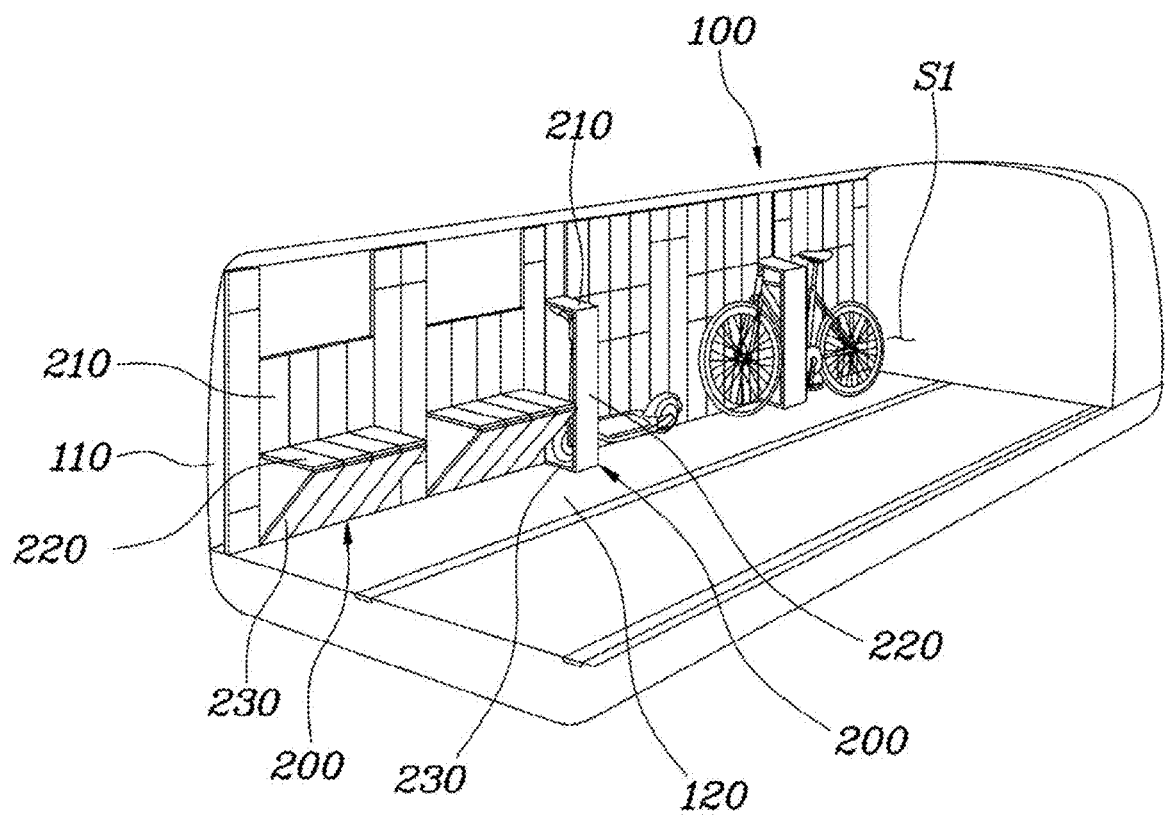
FIG. 2 is a view showing a functional implementation of the space utilization apparatus of mobility shown in FIG. 1.

FIG. 1 is a view showing a space utilization apparatus of mobility according to various exemplary embodiments of the present disclosure, and FIG. 2 is a view showing a functional implementation of the space utilization apparatus of mobility shown in FIG. 1.

Figure 3:
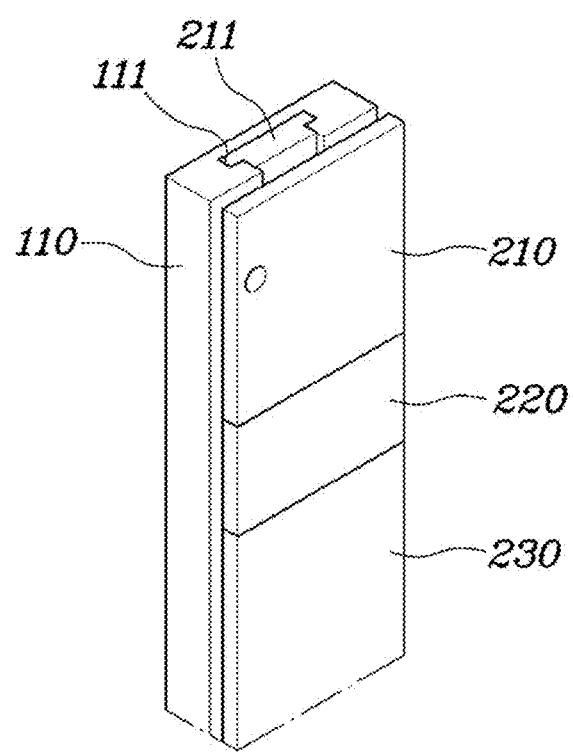
FIG. 3 is a view showing a variable mechanism in which a seating function is implemented in an exemplary embodiment of the present disclosure.
Figure 4:
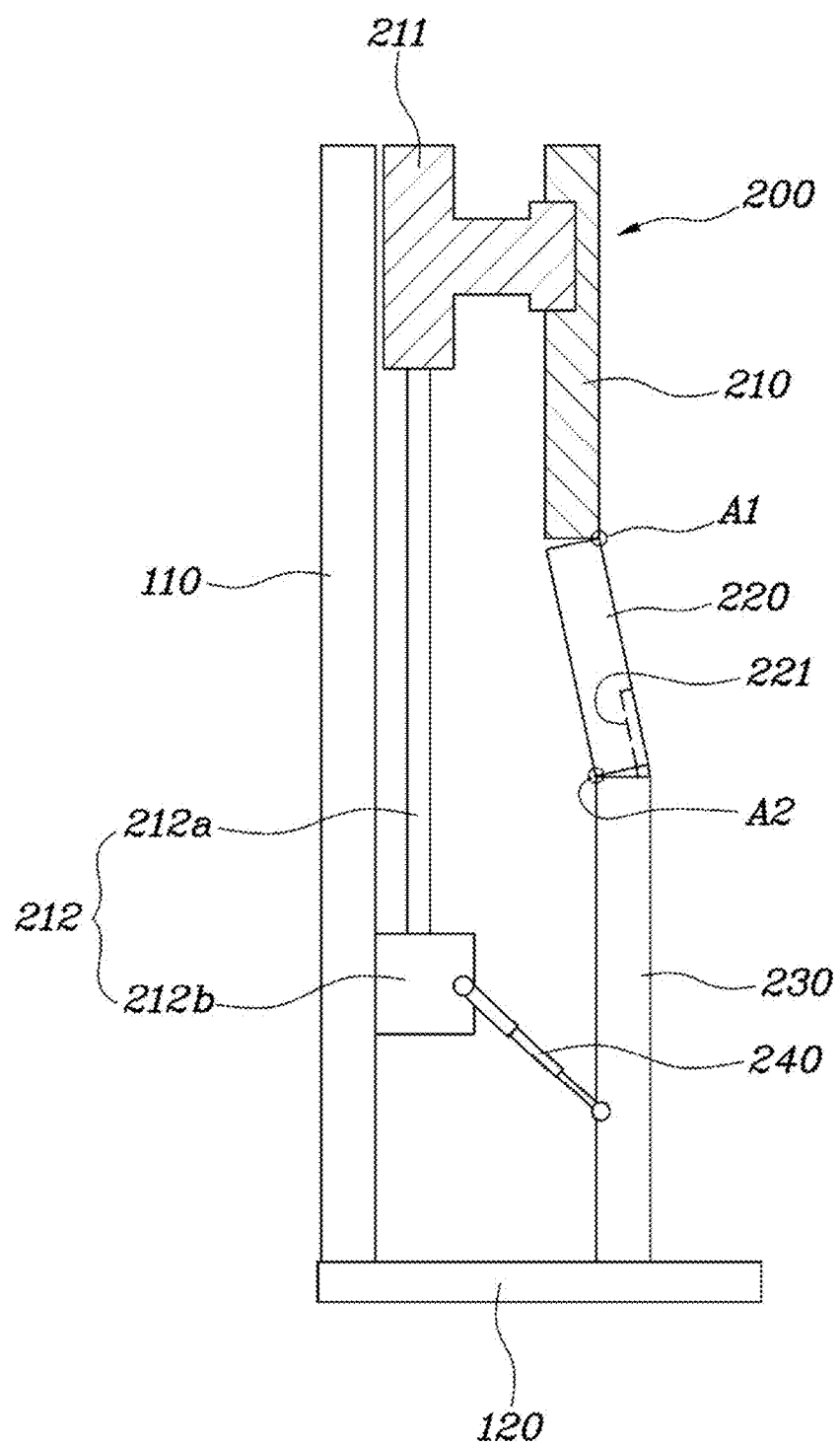
FIG. 4 is a cross-sectional view of the variable mechanism in which the seating function is implemented shown in FIG. 3.
Figure 5:
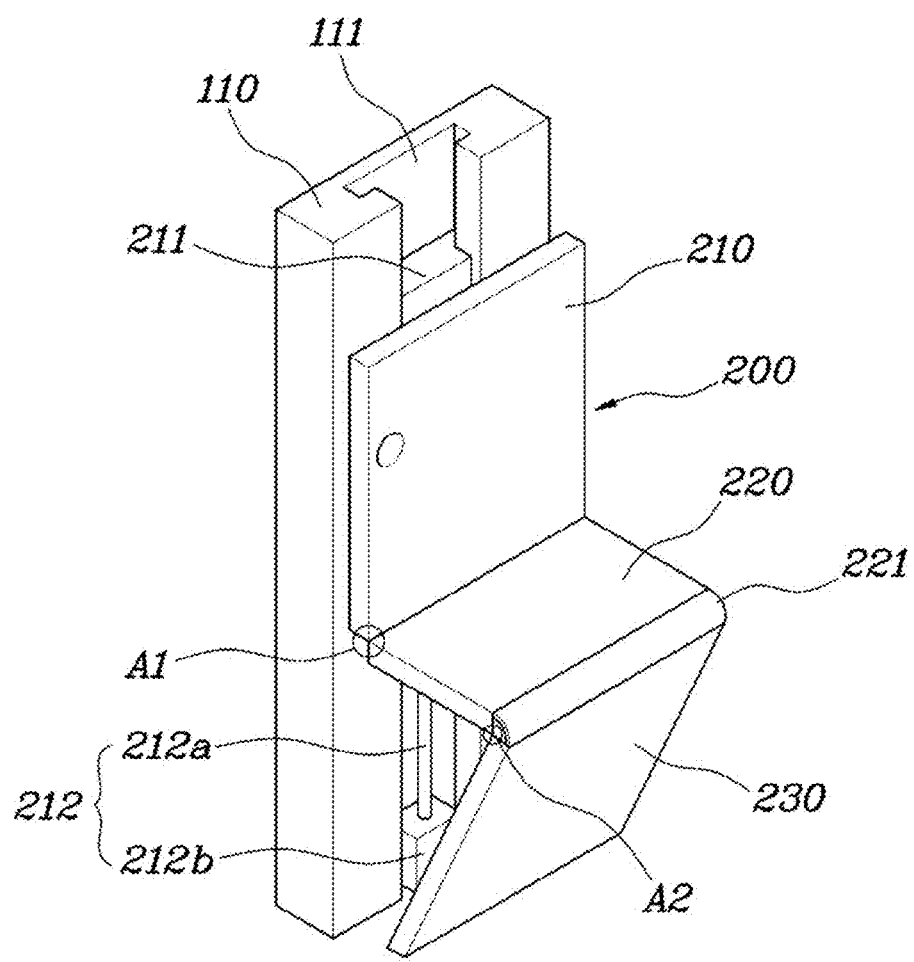
FIG. 5 is a view showing the shape transformation of the variable mechanism in which the seating function is implemented shown in FIG. 3.
Figure 6:
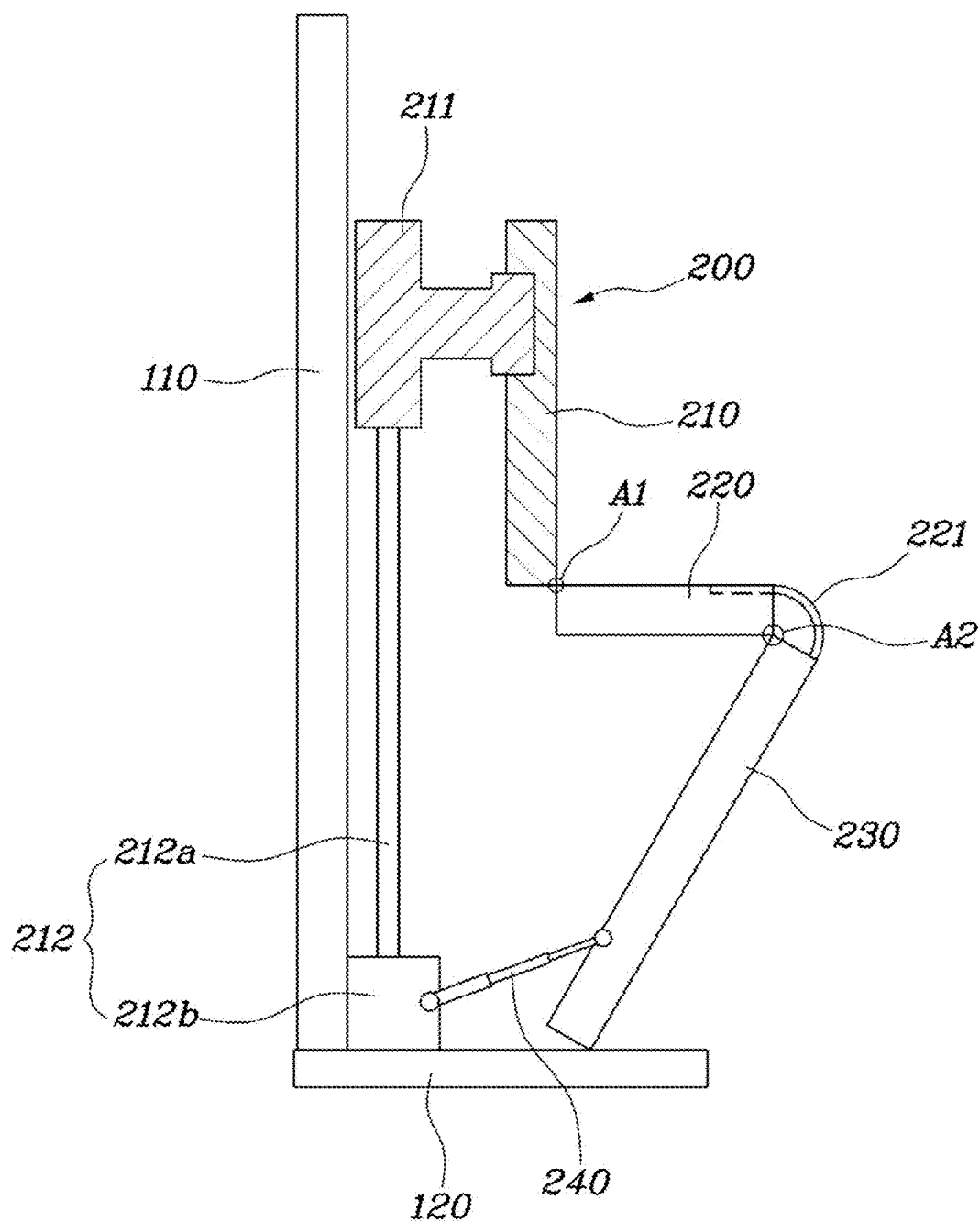
FIG. 6 is a cross-sectional view showing the shape transformation of the variable mechanism in which the seating function is implemented shown in FIG. 5.
Figure 7:
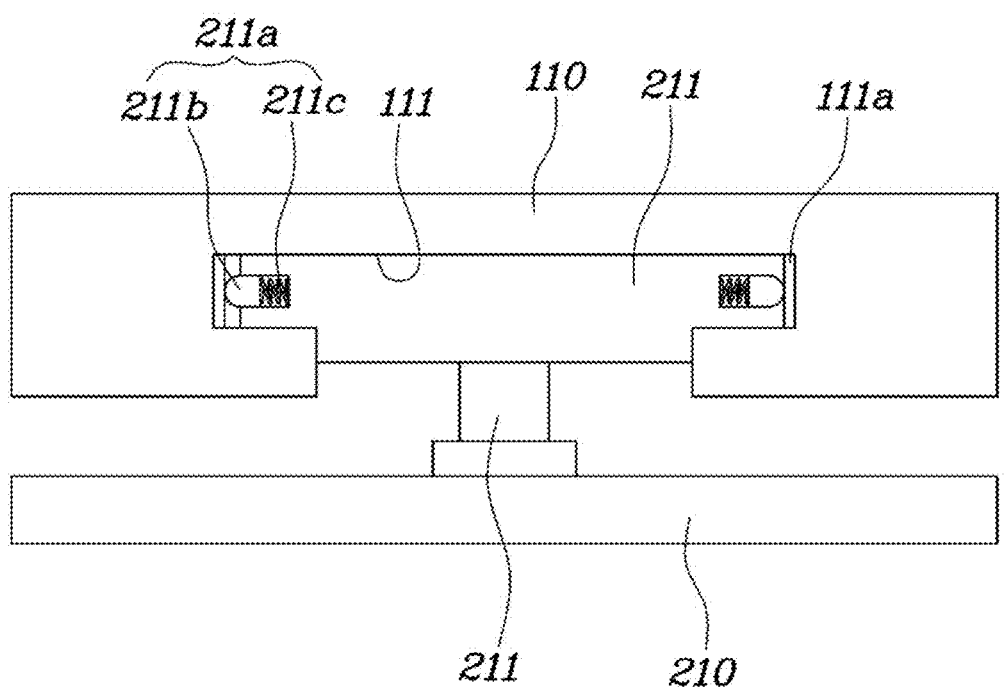
FIG. 7 is a view showing a sliding groove and a slider in the variable mechanism in which the seating function is implemented shown in FIG. 3.
Figure 8:
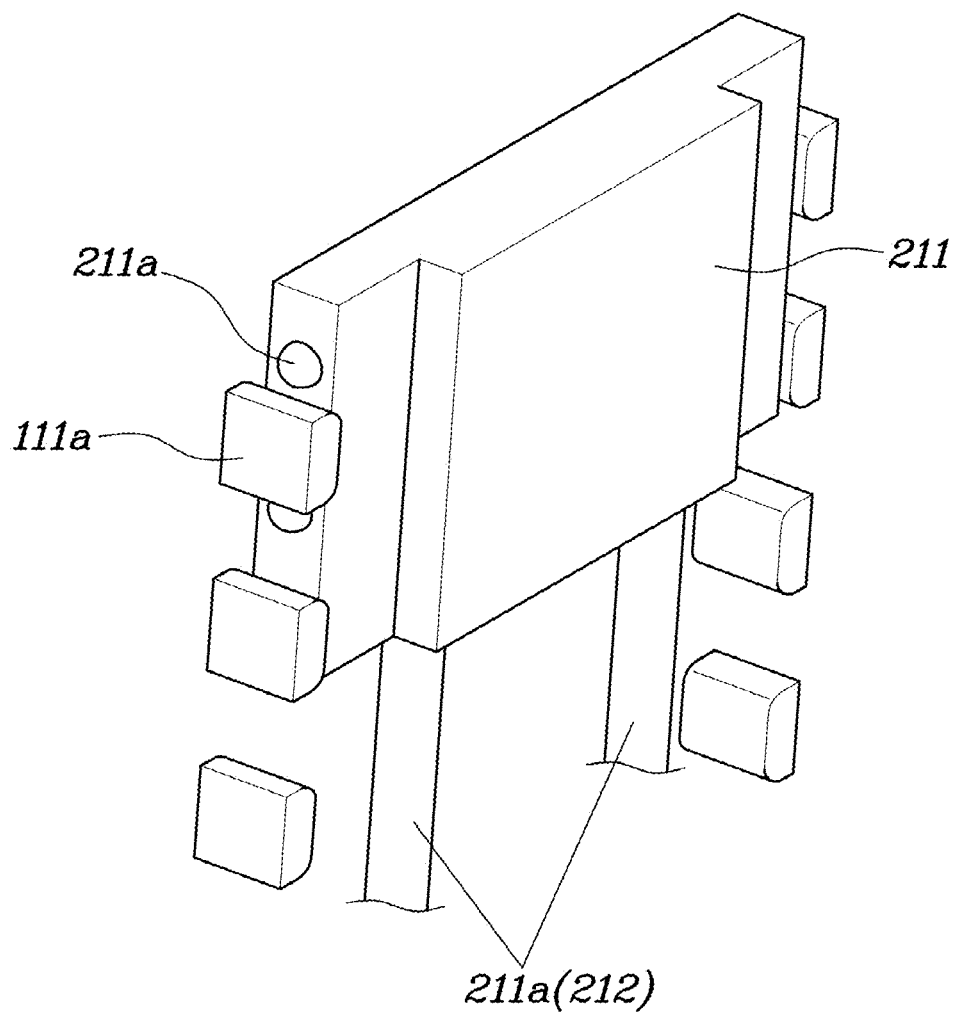
FIG. 8 is a view showing an elastic mechanism and a protrusion according to an exemplary embodiment of the present disclosure.

Furthermore, FIG. 3 is a view showing a variable mechanism in which a seating function is implemented in an exemplary embodiment of the present disclosure, FIG. 4 is a cross-sectional view of the variable mechanism in which the seating function is implemented shown in FIG. 3, FIG. 5 is a view showing the shape transformation of the variable mechanism in which the seating function is implemented shown in FIG. 3, FIG. 6 is a cross-sectional view showing the shape transformation of the variable mechanism in which the seating function is implemented shown in FIG. 5, FIG. 7 is a view showing a sliding groove and a slider in the variable mechanism in which the seating function is implemented shown in FIG. 3, and FIG. 8 is a view showing an elastic mechanism and a protrusion according to an exemplary embodiment of the present disclosure.

Figure 9:
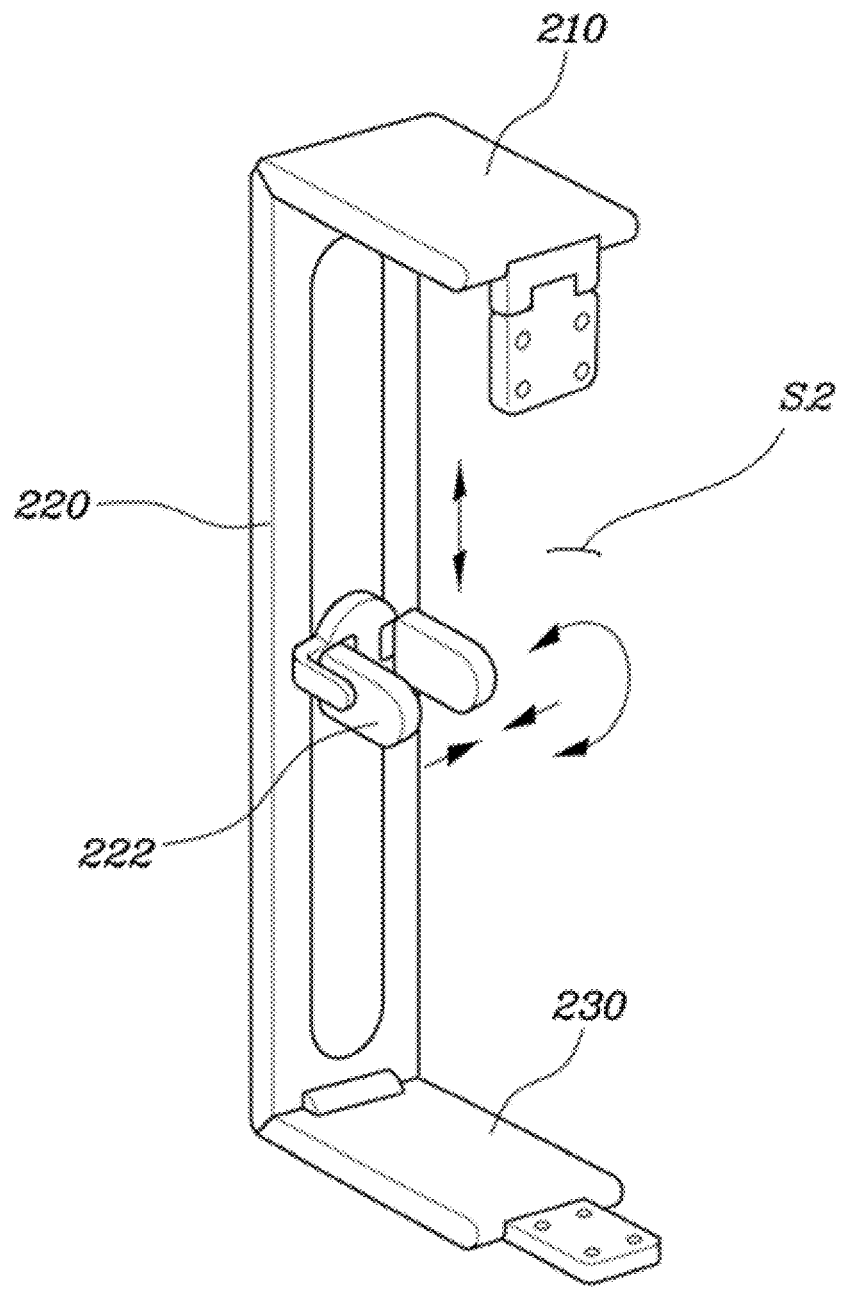
FIG. 9 is a view showing a variable mechanism in which a fixing function is implemented in an exemplary embodiment of the present disclosure.
Figure 10:
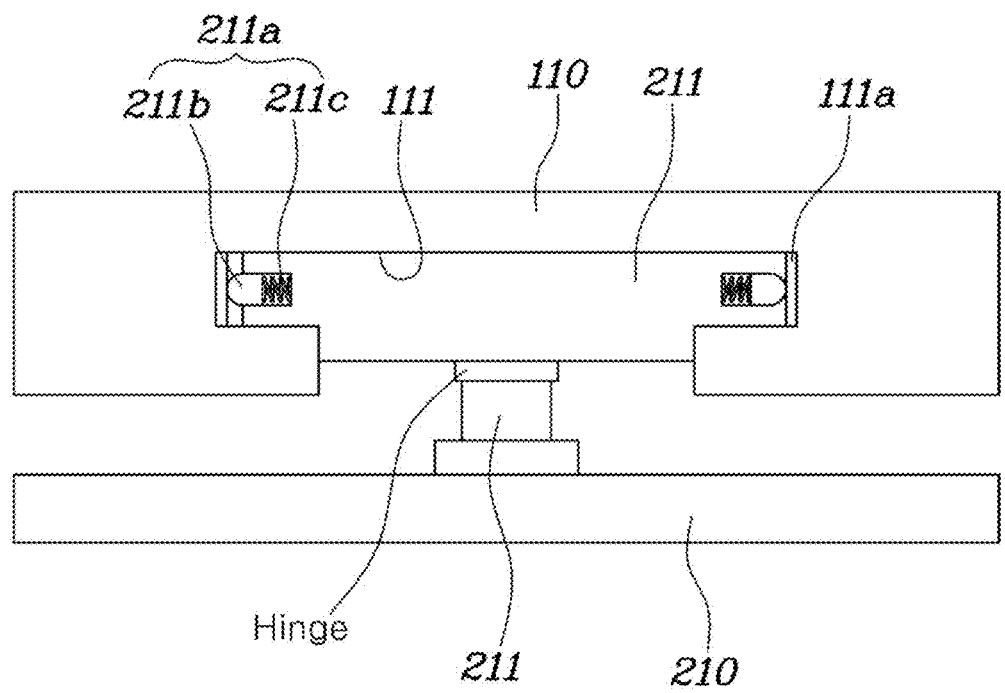
FIG. 10 is a view showing a sliding groove and a slider in the variable mechanism in which the fixing function is implemented shown in FIG. 9.
Figure 11:
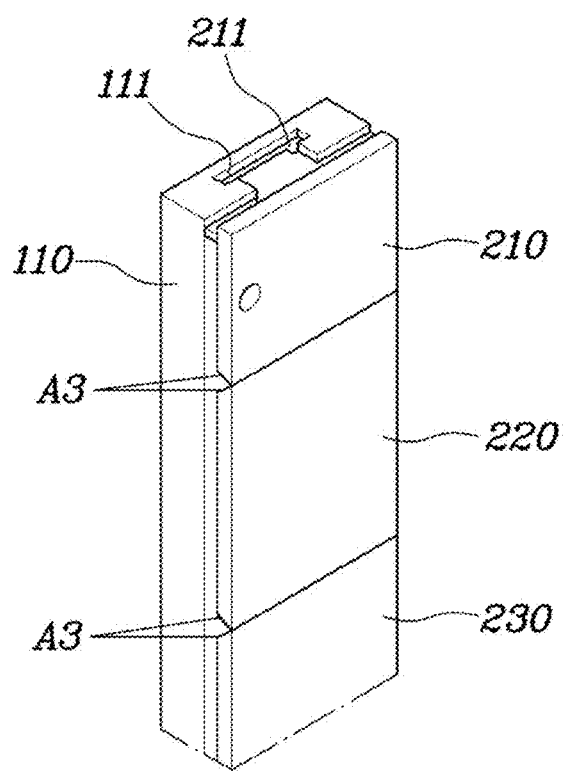
FIG. 11 is a view for explaining the variable mechanism in which the fixing function is implemented shown in FIG. 9.

Meanwhile, FIG. 9 is a view showing a variable mechanism in which a fixing function is implemented in an exemplary embodiment of the present disclosure, FIG. 10 is a view showing a sliding groove and a slider in the variable mechanism in which the fixing function is implemented shown in FIG. 9, and FIG. 11 is a view for explaining the variable mechanism in which the fixing function is implemented shown in FIG. 9.

As shown in FIG. 1 and FIG. 2, a space utilization apparatus of mobility according to an exemplary embodiment of the present disclosure includes a mobility 100 including an internal wall surface 110 and a cabin space S1 formed inside the internal wall surface 110; and a variable mechanism 200 which is provided along the internal surface 100 and includes a plurality of panels. Among the plurality of panels, a panel connected to the internal wall surface 110 is slidably or rotatably connected, and the remaining panels are rotatably connected so that a shape of the variable mechanism is transformed according to a rotational position of each panel to implement a plurality of functions.

Here, the mobility 100 may be configured to enable autonomous driving, and the cabin space S1 is formed to include the internal wall surface 110, a bottom surface 120 and a roof.

The mobility 100 is provided with a plurality of variable mechanisms 200 along the internal wall surface 110.

The variable mechanism 200 includes a plurality of panels, each panel slides or rotates on the internal wall surface 110 or is rotatably connected to each other. Due to the provided configuration, the variable mechanism 200 is transformed in shape according to the position at which each panel slides or rotates and moves, so that various functions may be implemented.

As an exemplary embodiment of the present disclosure, the variable mechanism 200 may implement a seating function when the rotational position of each panel is changed so that the shape is transformed into a chair shape, and may implement a storage function or a fixed function when the shape is transformed to form a storage space. Furthermore, the variable mechanism 200 may implement a predetermined function through shape transformation by changing the rotational position of each panel according to the function to be implemented.

Furthermore, each panel forming the variable mechanism 200 is provided on the internal wall surface 110 to form a wall surface, and various textures such as wood material may be applied according to the design of the cabin space S1.

Furthermore, the plurality of variable mechanisms 200 is partitioned and arranged for each function on the internal wall surface 110 of the mobility 100, and when the function is not implemented, each panel is maintained in an erected state, and when the function is implemented, each panel is configured to rotate toward the cabin space S1 and the shape is transformed.

That is, in a usual case, each panel of the variable mechanism 200 is erected and placed in close contact with the internal wall surface 110 to form a wall design, and when implementing a function, each panel slides and rotates to transform the shape, so that a specific function is implemented.

Furthermore, as the variable mechanism 200 is partitioned and arranged for each function on the internal wall surface 110 of the mobility 100, the congestion caused by the use of the function of the variable mechanism 200 by passengers is prevented.

Accordingly, in the variable mechanism 200 according to various exemplary embodiments of the present disclosure, the state in which each panel is accommodated on the internal wall surface 110 is maintained, so that the cabin space S1 of the mobility 100 is secured, and according to the passengers' needs, each panel slides and rotates so that the shape of the variable mechanism is transformed, providing convenience function.

Accordingly, when the convenience function is not used in the cabin space of the mobility 100, the cabin space S1 is secured as the panel is erected on the internal wall surface 110 and is in close contact with the internal wall surface 110, and the space utilization is improved as the convenience function is selectively provided.

When describing the present disclosure described above in detail, the variable mechanism 200 according to various exemplary embodiments of the present disclosure includes an upper panel 210 including one end portion slidably provided on the internal wall surface 110; a middle panel 220 including one end portion rotatably connected to the other end portion of the upper panel 210; and a lower panel 230 including one end portion rotatably connected to the other end portion of the middle panel 220 and the other end portion rotatably provided on the internal wall surface 110 or a bottom surface 120.

Accordingly, the variable mechanism 200 may include the upper panel 210, the middle panel 220, and the lower panel 230. The upper panel 210 is slidably provided on the internal wall surface 110 and the rotational positions of the middle panel 220 and the lower panel 230 may be changed according to the vertical movement of the upper panel 210. Here, the upper panel 210 may selectively slide through a locking device provided on the internal wall surface 110 of the mobility 100, and the locking device may be selectively operated depending on whether a switch provided on the upper panel 210 is operated or by electronical control.

That is, the variable mechanism 200 forms a wall surface of the cabin space S1 when the upper panel 210, the middle panel 220, and the lower panel 230 are spread out and are in close contact with the internal wall surface 110. Here, when the upper panel 210 moves downward, the middle panel 220 connected to the upper panel 210 rotates, and the lower panel 230 connected to the middle panel 220 is interlocked and rotates. Accordingly, the upper panel 210, the middle panel 220, and the lower panel 230 are transformed in their entire form to form a form configured for implementing a specific function.

Different functions may be implemented by differently changing the lengths of the upper panel 210, the middle panel 220, and the lower panel 230 of the plurality of variable mechanisms 200, or changing the rotation direction of each panel.

Furthermore, the variable mechanism 200 may include additional panel in addition to the upper panel 210, the middle panel 220, and the lower panel 230, so that various functions may be implemented through various types of deformation.

In according to an exemplary embodiment of the present disclosure, the functional implementation according to the configuration of the upper panel 210, the middle panel 220, and the lower panel 230 will be described.

As an exemplary embodiment of the present disclosure, as shown in FIGS. 3 to 8, as the upper panel 210 slides downward, and the middle panel 220 and the lower panel 230 rotate from the upper panel 210 toward the cabin space S1, the variable mechanism 200 may be transformed into a form for implementing the seating function.

That is, the variable mechanism 200 implements the seating function when transformed. When the upper panel 210 slides downward, the middle panel 220 and the lower panel 230 are interlocked to rotate toward the cabin space S1, so that the variable mechanism is transformed into a chair shape.

Accordingly, when forming a chair shape, the variable mechanism 200 is transformed so that the upper panel 210 supports the passenger's upper body, the middle panel 220 supports the passenger's lower body, and the lower panel 230 supports the upper panel 210 and the middle panel 220.

In the present way, in the state in which the variable mechanism 200 is in close contact with the internal wall surface 110 of the mobility 100, when the passenger requests the seating function, the upper panel 210 moves downward, and accordingly, the middle panel 220 and the lower panel 230 rotate so that the variable mechanism 200 is transformed into the chair shape to provide the seating function.

To the present end, the variable mechanism 200 may have a longer length in an order of the middle panel 220, the upper panel 210, and the lower panel 230.

That is, when the variable mechanism 200 is transformed into the chair shape to implement the seating function, the upper panel 210 supports the waist and back of the passenger, and the middle panel 220 supports the hip of the passenger, and the lower panel 230 supports the upper panel 210 and the middle panel 220. Accordingly, the upper panel 210 must have a height to stably support the passenger's waist and back, the middle panel 220 must be long enough to accommodate the passenger's buttocks, and the lower panel 230 must have a height for a stable leg posture of the passenger.

Accordingly, the variable mechanism 200 may have a longer length in an order of the middle panel 220, the upper panel 210, and the lower panel 230.

Here, the rotation shaft A1 of the upper panel 210 and the middle panel 220 is provided at an end portion in the direction away from the internal wall surface 110 at a connection portion of the other end portion of the upper panel 210 and one end portion of the middle panel 220.

Accordingly, the rotation shaft A1 of the upper panel 210 and the middle panel 220 is positioned on the cabin space S1 away from the internal wall surface 110, so that when the upper panel 210 slides downward and the lower panel 230 rotates, the gap between the upper panel 210 and the lower panel 230 is minimized. Thus, the occurrence of a foreign matter is prevented when the passenger is accommodated on the middle panel 220. Furthermore, when the middle panel 220 rotates toward the cabin space S1 in the upper panel 210, the interference with the upper panel 210 is avoided and the middle panel can rotate normally.

Furthermore, the rotation shaft A2 of the middle panel 220 and the lower panel 230 may be provided at the end portion of the internal wall surface 110 at a connection portion between the other end portion of the middle panel 220 and one end portion of the lower panel 230.

Therefore, as the rotation shaft A2 of the middle panel 220 and the lower panel 230 is positioned on the internal wall surface 110, the upper panel 210 slides downward and the middle panel 220 rotates in the upper panel 210 and at the same time, the lower panel 230 rotates from the middle panel 220. In the instant case, as one end portion of the lower panel 230 is connected to the other end portion of the middle panel 220 and the other end portion of the lower panel is rotatably connected to the bottom surface 120 or the internal wall surface 110 of the mobility 100, the lower panel 230 is shaped to support the middle panel 220. Furthermore, when the lower panel 230 rotates in the middle panel 220, the interference with the middle panel 220 is avoided and the lower panel can rotate normally.

Furthermore, a flexible cover 221 which is retractably or withdrawable provided at the other end portion of the middle panel 220 is connected to one end portion of the lower panel 230, so that when the lower panel 230 rotates in the middle panel 220, the flexible cover 221 is disposed in the gap between the middle panel 220 and the lower panel 230.

Here, the flexible cover 221 is configured to be transformable, and is provided to be drawn in or drawn out from the other end portion of the middle panel 220. Furthermore, the flexible cover 221 is connected to one end portion of the lower panel 230 in a state provided at the other end portion of the middle panel 220, so that when the lower panel 230 rotates in the middle panel 220, the flexible cover 221 is disposed in the gap between the middle panel 220 and the lower panel 230. Therefore, the feeling of foreign matter due to the gap between the middle panel 220 and the lower panel 230 is minimized. Furthermore, the flexible cover 221 is curved to be bent when the lower panel 230 rotates in the middle panel 220, so that the feeling of foreign matter generated by the passenger accommodated on the middle panel 220 is minimized.

On the other hand, the middle panel 220 is disposed to be inclined at oblique line so that the lower panel 230 is spaced from the internal wall surface than the upper panel 210.

In the present way, the middle panel 220 is disposed to be inclined at oblique line in an initial state, so that the mechanism conversion in which the middle panel 220 and the lower panel 230 rotate as the upper panel 210 slides downward may be flexibly operated. That is, when the upper panel 210 slides downward, the middle panel 220 and the lower panel 230 smoothly rotate toward the cabin space S1 by the force that the upper panel 210 moves according to pressing the inclinedly disposed middle panel 220.

On the other hand, a sliding groove 111 extending in a vertical direction is formed on the internal wall surface 110, and a slider 211 which is inserted into the sliding groove 111 and moves along the sliding groove 111 may be provided at one end portion of the upper panel 210.

Accordingly, the upper panel 210 may be slidably provided on the internal wall surface 110 via the slider 211, and as the sliding groove 111 formed on the internal wall surface 110 extends in the vertical direction, when the slider 211 moves along the sliding groove 111, the upper panel 210 may move vertically on the internal wall surface 110.

The sliding groove 111 is formed in a 'T' shape, and the slider 211 is formed in a 'T' shape to match the sliding groove 111 so that the slider 211 can move smoothly in the vertical direction without being separated from the sliding groove 111.

Furthermore, both end portions of the slider 211 are provided with an elastic mechanism 211*a* which is elastically drawn in or drawn out, and a plurality of protrusions 111*a* contacting with the elastic mechanism 211*a* when the slider 211 moves may be provided in the sliding groove 111 in the vertical direction.

Here, the elastic mechanism 211*a* includes a spring 211*c* and a ball 211*b*, and in a state in which the spring 211*c* is built in both end portions of the slider 211, the ball 211*b* is withdrawn by the elastic force of the spring 211*b*.

Furthermore, the protrusion 111*a* provided in the sliding groove 111 is configured to be elastically transformable and is provided in plurality along the sliding groove 111.

Therefore, when the slider 211 moves in the sliding groove 111, the elastic mechanism 211*a* provided on the side surface of the slider 211 moves by the friction with the sliding groove 111, and the moving speed of the slider 211 is reduced when the elastic mechanism 211a is in contact with the protrusion 111a, so that the slider 211 can move smoothly.

Accordingly, by moving the slider 211 at an excessive speed when moving in the sliding groove 111, the upper panel 210, the middle panel 220, and the lower panel 230 are prevented from lowering the operating performance and impact. Because the moving speed of the 211 is adjusted by the contact between the elastic mechanism 211a and the protrusion 111a, a sense of luxury is provided as the slider 211 moves.

Meanwhile, the slider 211 is provided with a stopper 212 that extends downward and is spaced from the bottom surface 120 of the mobility 100 with a predetermined distance in an initial state in which the upper panel 210, the middle panel 220, and the lower panel 230 are unrotated. As each panel is configured to rotate when a specific function is implemented, the stopper 212 is supported on the bottom surface 120 to fix the rotational position of each panel.

Accordingly, the slider 211 is provided with the stopper 212 extending downward, so that when the slider 211 moves downward, the movement is limited only to a distance where the stopper 212 comes into contact with the bottom surface 120 of the mobility 100. Thus, the upper panel 210, the middle panel 220, and the lower panel 230 can rotate and transform only to the shape for implementing the function.

Here, the stopper 212 may be configured with a rod portion 212a extending downwardly from the slider 211 and an impact absorbing portion 212b coupled to the end portion of the rod portion 212a and made of a material capable of absorbing impact.

Through this, when the seating function is implemented in the variable mechanism 200, the upper panel 210 slides downward, and then the middle panel 220 and the lower panel 230 rotate, but the sliding of the upper panel 210 is limited when the stopper 212 is in contact with the bottom surface of the mobility 100. In the instant case, the position where the stopper 212 is in contact with the bottom surface 120 is set to a position where the middle panel 220 and the lower panel 230 are transformed together into the chair shape as the upper panel 210 moves downward.

On the other hand, the variable mechanism 200 further include a lifting mechanism 240 that has one end portion connected to the stopper 212 or the internal wall surface 110 and the other end portion connected to the lower panel 230 to adjust the rotation speed of the lower panel 230 when the lower panel 230 rotates.

Here, the lifting mechanism 240 may be configured as a gas lifter.

In the lifting mechanism 240 according to various exemplary embodiments of the present disclosure, one end portion thereof is connected to the stopper 212 and the other end portion thereof is connected to the lower panel 230, so that as the upper panel 210 slides downward, the lifting mechanism 240 pushes the lower panel 230 when the stopper 212 moves downward. Thus, the rotational operation of the lower panel 230 may be smoothly performed. Furthermore, when the variable mechanism 200 is transformed to the initial state, the upper panel 210 moves upward, the stopper 212 is also raised, and the lifting mechanism 240 supports the rotation of the lower panel 230.

Accordingly, in the variable mechanism 200, the lifting mechanism 240 supports the operation of the respective panels when the respective panels are functionally implemented or returned to their initial positions, so that the sliding and rotating operations of the respective panels may be smoothly performed.

Accordingly, the variable mechanism 200 according to various exemplary embodiments of the present disclosure can implement the seating function. That is, as shown in FIG. 4, in the initial state, the upper panel 210, the middle panel 220, and the lower panel 230 are maintained in an unfolded state.

Here, as shown in FIG. 6, when the upper panel 210 slides downward, the middle panel 220 and the lower panel 230 rotate and transform into the chair shape to implement the seating function.

As another exemplary embodiment of the present disclosure, as shown in FIGS. 9 to 11, the upper panel 210 rotates toward the cabin space 51 while sliding downward, the lower panel 230 also rotates toward the cabin space, and thus, the middle panel 220 moves toward the cabin space 51 to form a storage space S2 inside. Accordingly, the variable mechanism 200 can transform into a shape for implementing a storage function.

That is, the storage function is implemented through the variable mechanism 200. When the upper panel 210 rotates while sliding downward, the lower panel 230 also rotates, so that the middle panel 220 advances toward the cabin space S1, forming the storage space S2 inside.

Accordingly, in the variable mechanism 200, as the upper panel 210, the middle panel 220, and the lower panel 230 form a 'C' shape, the storage space S2 is formed inside, and a luggage including the small mobility 100 may be accommodated in the storage space S2.

Accordingly, in a state in which the variable mechanism 200 is in close contact with the internal wall surface 110 of the mobility 100, when a passenger requests the storage function, the upper panel 210 rotates while moving downward, and the lower panel 230 also rotates together. As a result, the middle panel 220 advances into the cabin space S1 and the form of a storage box forming the storage space S2 is formed, providing the storage function.

Meanwhile, in the variable mechanism 200, the middle panel 220 may be the longest, and the lengths of the upper panel 210 and the lower panel 230 may be shorter than the length of the middle panel 220.

That is, when the variable mechanism 200 is transformed to form the storage space S2, the storage space S2 is formed inside by the middle panel 220 connected to the upper panel 210 and the lower panel 230. In the instant case, when the lengths of the upper panel 210 and the lower panel 230 are excessive, the length protruding toward the cabin space S1 is increased, and the lengths of the upper panel 210 and the lower panel 230 are configured to be shorter than the length of the middle panel 220, so that the practicality of the storage space S2 may be secured and also the cabin space S1 may be secured.

On the other hand, the sliding groove 111 extending in the vertical direction is formed on the internal wall surface 110, and the slider 211 which is inserted into the sliding groove 111 and moves along the sliding groove 111 may be rotatably connected at one end portion of the upper panel 210.

Accordingly, the upper panel 210 is slidably provided on the internal wall surface 110 via the slider 211, and as the sliding groove 111 formed on the internal wall surface 110 extends in the vertical direction, when the slider 211 moves along the sliding groove 111, the upper panel 210 may move vertically on the internal wall surface 110. Furthermore, the upper panel 210 may be rotatably connected to the slider 211 and moves to a position for realizing the storage function.

Here, the sliding groove 111 is formed in a 'T' shape, and the slider 211 is formed in a 'T' shape to match the sliding groove 111 so that the slider 211 can move smoothly in the vertical direction without separating from the sliding groove 111.

Furthermore, because the upper panel 210 is rotatably connected to the slider 211, sliding and rotation operations may be performed in the sliding groove 111. That is, when the upper panel 210 moves downwardly in the sliding groove 111 through the slider 211, the middle panel 220 and the lower panel 230 are interlocked, and the upper panel 210 rotates together in the cabin space S1 to form the storage space S2 together with the middle panel 220 and the lower panel 230.

Meanwhile, a clamping mechanism 222 for fixing the small mobility 100 is provided inside the middle panel 220. The clamping mechanism 222 may be configured to fix various luggage including a bicycle as well as the small mobility 100 in FIG. 9. Furthermore, the clamping mechanism 222 may be further configured with a belt or a cable to stably fix various kinds of luggage disposed in the storage space S2.

On the other hand, in FIG. 11, a chamfer A3 is provided in the portion where the other end portion of the upper panel 210 and one end portion of the middle panel 220 match each other and in the portion where the other end portion of the middle panel 220 and one end portion of the lower panel 230 match each other, respectively.

That is, in the variable mechanism 200 for the storage function, when the upper panel 210 and the lower panel 230 rotate, they come into contact with both end portions of the middle panel 220. The chamfer A3 is formed at each of the contact portion between the middle panel 220 and the upper panel 210 and the contact portion between the middle panel 220 and the lower panel 230, so that the chamfer A3 is matched at both end portions of the middle panel 220 to maintain a stable support structure when the upper panel 210 and the lower panel 230 rotate.

In the space utilization apparatus of mobility having the structure as described above, each panel forming the variable mechanism is maintained in a state accommodated on the internal wall surface to secure a cabin space for mobility, and the rotational position of each panel is changed according to the needs of passengers, so that the shape is transformed to provide convenience functions.

Accordingly, when the convenience function is not used in the cabin space of mobility, the unused space of the cabin space is removed to secure the cabin space, and the space utilization is improved as the convenient function is selectively provided.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A space utilization apparatus for a vehicle, the space utilization apparatus comprising:
    the vehicle including an internal wall surface and a cabin space formed in a direction facing the internal wall surface; and
    a variable mechanism provided along the internal wall surface, and including a plurality of panels,
    wherein among the plurality of panels, a panel is slidably connected to the internal wall surface, and remaining panels are rotatably connected to the panel so that a shape of the variable mechanism is transformed according to a rotational position of each remaining panel so as to implement a given function,
    wherein the panel of the variable mechanism includes an upper panel having a first end portion slidably provided on the internal wall surface, and
    wherein the remining panels of the variable mechanism include:
        a middle panel including a first end portion rotatably connected to a second end portion of the upper panel; and
        a lower panel including a first end portion rotatably connected to a second end portion of the middle panel and a second end portion rotatably provided on the internal wall surface or a bottom surface of the vehicle,
    wherein the variable mechanism is transformed into a shape for implementing a seat as the upper panel slides downward, and the middle panel and the lower panel rotate from the upper panel toward the cabin space, and
    wherein a flexible cover which is provided to be drawable in or out at the second end portion of the middle panel is connected to the first end portion of the lower panel, so that when the lower panel rotates in the middle panel, the flexible cover is disposed in a separation space between the middle panel and the lower panel.

2. The space utilization apparatus of claim 1, wherein the variable mechanism is in plural, and each of the plurality of variable mechanisms is arranged separately for each function on the internal wall surface of the vehicle, and when the function is not implemented, each panel is maintained in an erected state, and when the function is implemented, the remaining panels are configured to rotate toward the cabin space and the shape is transformed.

3. The space utilization apparatus of claim 1, wherein the variable mechanism has a longer length in an order of the middle panel, the upper panel, and the lower panel.

4. The space utilization apparatus of claim 1, wherein a sliding groove extending in a predetermined direction is formed on the internal wall surface, and one end portion of the upper panel is provided with a slider which is inserted into the sliding groove and is configured to move along the sliding groove.

5. The space utilization apparatus of claim 4, wherein the slider is provided with a stopper that extends downward from the slider and is spaced from the bottom surface of the vehicle with a predetermined distance in an initial state in which the upper panel, the middle panel, and the lower panel are unrotated, and in implementing the seat, as each panel rotates, the stopper is supported on the bottom surface to fix a rotational position of each panel.

6. The space utilization apparatus of claim 5, wherein the variable mechanism further includes a lifting mechanism including a first end portion connected to the stopper or the internal wall surface and a second end portion connected to the lower panel to adjust a rotation speed of the lower panel when the lower panel rotates.

7. The space utilization apparatus of claim 4, wherein an elastic mechanism which is elastically drawn in or drawn out is provided at an end portion of the slider, and the sliding groove is provided with a plurality of protrusions that comes into contact with the elastic mechanism when the slider moves in the predetermined direction.

8. The space utilization apparatus of claim 7, wherein the elastic mechanism includes a spring and a ball, and in a state in which the spring is built in the end portion of the slider, the ball is selectively withdrawn by an elastic force of the spring.

9. The space utilization apparatus of claim 1, wherein a rotation shaft of the upper panel and the middle panel is provided at an end portion of the upper panel and the middle panel in a direction away from the internal wall surface at a connection portion of the second end portion of the upper panel and the first end portion of the middle panel.

10. The space utilization apparatus of claim 1, wherein a rotation shaft of the middle panel and the lower panel is provided at an end portion of the middle panel and the lower panel in a direction near from the internal wall surface at a connection portion of the second end portion of the middle panel and the first end portion of the lower panel.

11. The space utilization apparatus of claim 1, wherein the middle panel is disposed to be inclined at an oblique line and the lower panel is further spaced apart from the internal wall surface than the upper panel.

12. The space utilization apparatus of claim 1, wherein the variable mechanism is transformed into a shape for implementing a storage as the upper panel slides downward and rotates toward the cabin space, the lower panel rotates toward the cabin space, and the middle panel moves toward the cabin space to form a storage space thereinside.

13. The space utilization apparatus of claim 12, wherein the variable mechanism is configured so that the middle panel is longest, and lengths of the upper and lower panels are shorter than the length of the middle panel.

14. The space utilization apparatus of claim 12, wherein a sliding groove extending in a predetermined direction is formed on the internal wall surface, and a slider which is inserted into the sliding groove and moves along the sliding groove is connected at one end portion of the upper panel.

15. The space utilization apparatus of claim 12, wherein a clamping mechanism for fixing an additional vehicle is provided inside the middle panel.

16. The space utilization apparatus of claim 12, wherein a chamfer is formed in a portion where the second end portion of the upper panel and the first end portion of the middle panel match each other and at a portion where the second end portion of the middle panel and the first end portion of the lower panel match each other, respectively.

17. A space utilization apparatus for a vehicle, the space utilization apparatus comprising:
   the vehicle including an internal wall surface and a cabin space formed in a direction facing the internal wall surface; and
   a variable mechanism provided along the internal wall surface, and including a plurality of panels,
   wherein among the plurality of panels, a panel is slidably connected to the internal wall surface, and remaining panels are rotatably connected to the panel so that a shape of the variable mechanism is transformed according to a rotational position of each remaining panel so as to implement a given function,
   wherein the panel of the variable mechanism includes an upper panel having a first end portion slidably provided on the internal wall surface, and
   wherein the remining panels of the variable mechanism include:
      a middle panel including a first end portion rotatably connected to a second end portion of the upper panel; and
      a lower panel including a first end portion rotatably connected to a second end portion of the middle panel and a second end portion rotatably provided on the internal wall surface or a bottom surface of the vehicle,
   wherein the variable mechanism is transformed into a shape for implementing a storage as the upper panel slides downward and rotates toward the cabin space, the lower panel rotates toward the cabin space, and the middle panel moves toward the cabin space to form a storage space thereinside, and
   wherein a clamping mechanism for fixing an additional vehicle is provided inside the middle panel.

* * * * *